May 20, 1969  R. L. TIEDE  3,445,254
GLASS FIBERS AND TREATMENT THEREFOR
Filed Oct. 14, 1964
Fig. 1  STRAND
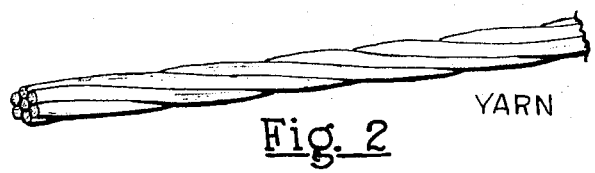
Fig. 2  YARN
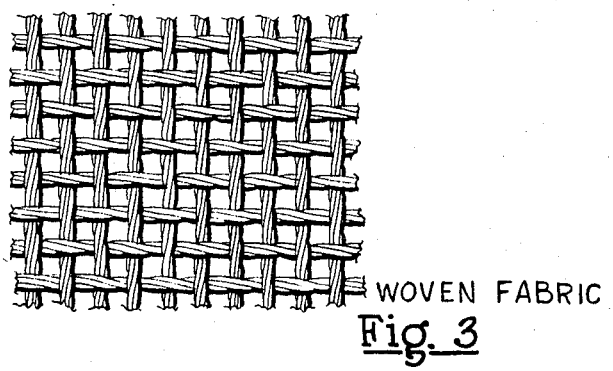
Fig. 3  WOVEN FABRIC
LAMINATE
Fig. 4
INVENTOR.
RALPH L. TIEDE
BY
ATTORNEYS United States Patent Office
3,445,254
Patented May 20, 1969

3,445,254
GLASS FIBERS AND TREATMENT THEREFOR
Ralph L. Tiede, Newark, Ohio, assignor, by mesne assignments, to the United States of America as represented by the United States Atomic Energy Commission
Continuation-in-part of application Ser. No. 15,073, Mar. 15, 1960. This application Oct. 14, 1964, Ser. No. 403,831
Int. Cl. C03c 3/04, 13/00, 25/00
U.S. Cl. 106—50               8 Claims

ABSTRACT OF THE DISCLOSURE

Siliceous fibers containing a network former, a leachable metal oxide, and at least one oxide excitable by fission recoil energy, are formed through conventional fiber forming units, and are post treated by a process of leaching and sintering to obtain a high-temperature resistant fiber comprising a network former and an oxide excitable by fission recoil energy. The fiber may be further enriched by coating it with a salt of the rare earth and subsequently reducing it to the oxide.

---

This is a continuation-in-part of my copending application Ser. No. 15,073, filed Mar. 15, 1960, now abandoned.

This invention relates to glass fibers comprising composition which include as an essential ingredient at least one oxide which is excitable by fission recoil energy.

A great deal of work has been accomplished related to finding specific glass compositions which include oxides of thorium, uranium and plutonium as an essential ingredient, which compositions are especially suited for fuel element fabrication for use as elements in radiation chemistry, as a heat source in a reactor, for chemical processing and in reactor technology and the like. It is necessary in many of these applications to increase the proportion of thoria, urania or plutonia to as high a figure as possible in order to obtain satisfactory results.

In order for such glass compositions to be suitable for use in the production of fibers, they must meet an exacting set of standards. Fiber production, according to present-day high speed methods, requires that a glass melt be produced either from marbles, cullet or from basic raw materials. In either event, a rather substantial amount of molten glass is maintained for discharge in fine streams through orifices in feeders, commonly called bushings, the streams then being attenuated in any of numerous manners into the fine fibers desired. Continuous fibers which are pulled and wound upon a collet winder have been produced from the compositions of the present invention. This process is well-known to all those skilled in the art. The invention herein relates not to the details of a specific fiber forming process but rather to specific glass compositions and post-treatment of fibers made from the compositions to provide glass fibers having a very high proportion of the radioactive material. The glass compositions must provide the necessary viscosity-temperature relationships to allow fiberization and they also must provide the desired physical properties such as durability and strength which have been found necessary in compositions which are to be manufactured into fibers. The invention also relates to yarns and fabrics produced from these fibers.

Glass as it is commonly known is a super-cooled liquid and is not in an equilibrium condition. As ordinary glass is heated from room temperature, it passes through a range of temperatures at which it softens, first to a relatively viscous liquid condition. Further heating of glass above the softening range eventually brings it to a liquidus or maximum devitrification temperature. Above the liquidus temperature the glass exists, under equilibrium conditions, as a liquid. Below such temperature, glass becomes transformed at equilibrium, into a crystalline state. At temperatures just below the liquidus, devitrification occurs at a rapid rate. Glass to be fiberized must be melted and must also be maintained at 100° F. or so above its liquidus in order to prevent devitrification or even partial devitrification which might occur in the melting tank or in the vicinity of the bushing or feeder if a lower temperature were maintained.

The range of temperature available in commercial production for fiberization, therefore, is between the liquidus temperature of the glass being fiberized and the maximum permissible operating temperature of the feeder. In order to be suited for the production of glass fibers by commercial techniques, glass must have a liquidus temperature substantially lower than the maximum permissible operating temperature of a feeder. The glass must have a viscosity suitable for fiberization at a temperature above its liquidus temperature but below such maximum bushing operating temperature.

It is an object of this invention to provide glass having a very high concentration of uranium or thorium.

It is a further object to provide a process for producing glass fibers having a high concentration of urania or thoria.

It is an object to produce fibers suitable for use in radiation chemistry and a process for treating these fibers to enrich them still further with materials excitable by fission recoil energy.

It is an object to provide high temperature resistant fibers and yarns and fabrics of these fibers.

It is an object to increase the temperature resistance of fibers comprising urania.

Further objects will be apparent from the description which follows.

The objects of this invention are achieved by the provision of glass compositions that have the necessary essential ingredients and are fiberizable by known techniques. These fibers are then chemically treated to increase the proportion of vital ingredients and thereby provide novel glass compositions in fibrous form. If desirable a plurality of fibers can be assembled into a strand, the strands twisted and plied into a yarn and the yarns woven into fabric which is then treated with a solvent such as an acid to provide a high temperature resistant fabric.

In the drawings:

FIGURE 1 is a view of a textile strand comprising a plurality of continuous fibers;

FIGURE 2 is a view of a textile yarn comprising glass fibers;

FIGURE 3 is a view of a fabric woven of the yarns of FIGURE 2, the openness of the weave being exaggerated; and FIGURE 4 is a view of a laminate comprising multiple layers of fabric.

Glass fibers have been leached for one hour with hydrochloric acid (equal parts of water and concentrated hydrochloric acid, 37% HCl grade) at 194° F. followed by three distilled water rinses and then dried at 240° F. These fibers were fired at 1800° F. for thirty minutes and the loss in weight was determined. The loss in weight figure was used in conjunction with the known composition of the glass to calculate the extent of leaching. Various acids were used, however, the preferred acids are sulfuric and hydrochloric. Nitric acid and acetic acid also can be used as seen in the following examples which are set forth to illustrate but not restrict the invention.

Soda is removed from the original glass by the leaching and firing process. The ignition loss of the fibers, if compared to the original soda content, will be found to be a nearly equivalent value. Any excess of leaching loss over and above the soda content represents a loss in urania, however, the losses of constituents other than soda during leaching are very small and in the range of about 1 percent for the compositions which will be given. If it is assumed that only soda is removed, the relative suitability of the glasses for leaching may be estimated by the nearness of these members to zero. The assumption that essentially all the soda is removed in the leaching was checked by chemical analyses on three leached and fired samples. Soda as used here means the oxide of sodium. The following glass compositions were leached with 1:1 hydrochloric acid and certain ones were leached with sulfuric and other acids as indicated.

Example 1

A glass composition comprising 60% silica, 24% soda and 16% urania was leached with 1:1 hydrochloric acid with a weight loss of 25.2%. The resulting fibers were in good condition and had a good retention of strength even after leaching. The urania content of the resulting fiber is 19.5% by weight.

Example 2

A glass composition comprising 63% silica, 20% soda and 17% urania in fibrous form was leached with 5:1 sulfuric acid to give strong fibers that experienced a 21% weight loss during leaching. The urania content of the fiber is 20.2%.

Example 3

Fibers having a glass composition comprising 63% silica, 24% soda and 13% urania were leached with a weight loss of 25% with fairly strong fibers resulting. The use of sulfuric acid, nitric acid and acetic acid gave weaker fibers than those achieved by using 1:1 hydrochloric acid. The resulting fiber was 16% by weight urania.

Example 4

Fibers having a composition comprising 60% silica, 28% soda and 12% urania were leached with a resulting 28.5% weight loss. The resulting fibers were fairly strong and it was found that sulfuric acid and acetic acid provided the strongest fibers. The fibers were 16.2% urania.

Example 5

Fibers having a glass composition comprising 61% silica, 31% soda and 8% urania were leached with a resulting 32.9% weight loss. The fibers were strong and it was discovered that sulfuric and nitric acid gave results similar to the use of hydrochloric acid. Acetic acid gave weaker fibers and is, therefore, not recommended over the other acids for this composition. The resulting glass fiber was 9.1% urania.

Example 6

A glass composition comprising 64% silica, 28% soda and 8% urania was melted and formed into fibers which were leached with a 29.3% weight loss. Strong fibers were produced when leaching with hydrochloric, sulfuric and nitric acid. The use of acetic acid gave weaker fibers and is not recommended. The fiber was 9.5% urania.

Example 7

Fibers produced from a glass composition comprising 64% silica, 32% soda and 4% urania were leached with 1:1 hydrochloric acid to provide a 34.4% weight loss. It was found that fibers having the above composition can be leached with acetic acid, nitric acid or sulfuric acid with similar results. The fiber was 2.4% urania.

Example 8

A glass composition comprising 68% silica, 28% soda and 4% urania was formed into fibers which were then leached with 1:1 hydrochloric acid with the resulting weight loss of 30.7%. Strong fibers were provided by the use of hydrochloric acid and also by the use of acetic, nitric or sulfuric acid. The resulting fibers were 1.9% urania.

Example 9

Fibers produced from a glass comprising 68% silica, 24% soda and 8% urania were leached with sulfuric acid to provide strong fibers which experienced a weight loss of 25.7%. Strong fibers were also produced when these fibers were leached with hydrochloric acid and nitric acid. The use of acetic acid for leaching gave weaker fibers and is not recommended. The resulting fiber was 8.5% urania.

Example 10

A glass composition comprising 68% silica, 20% soda and 12% urania was melted and fabricated into fibers which were leached with a resulting 21.3% weight loss. The fiber was 13.6% urania.

Example 11

A glass composition comprising 68% silica, 16% soda and 16% urania was produced in the form of fibers and leached with hydrochloric acid with the resulting 16.6% weight loss. The resulting fiber was 18.5% urania.

Example 12

A glass composition comprising 72% silica, 20% soda and 8% urania was melted and fabricated into fibers which were then leached with hydrochloric acid to provide a 21.5% weight loss. The fiber was 8.3% urania.

Example 13

Strong fibers were produced by leaching fibers comprising 60% silica, 36% soda and 4% urania, the resulting fibers having a 38.6% weight loss. Strong fibers were provided by the use of nitric, hydrochloric or sulfuric acids but weaker fibers resulted when acetic acid was utilized and this acid is not recommended for this composition. The leached fibers were 2.3% urania.

Example 14

A glass composition comprising 58% silica, 35% soda and 8% urania was fabricated into fibers and leached with 1:1 hydrochloric acid with a 36.1% weight loss resulting. Sulfuric and nitric acid also gave good results but acetic acid gave weaker fibers and is not recommended for this composition. The resulting fiber was 10.6% urania.

Example 15

A glass composition comprising 57% silica, 31% soda and 12% urania was fabricated into fibers which were then leached to provide strong fibers. A 35.5% weight loss resulted from the leaching and firing process. The use of hydrochloric acid gave strong fibers but a high loss of urania. Likewise, the use of sulfuric acid for leaching gave strong fibers which had a weight loss of only 32%. Nitric and acetic acids gave a weight loss of 32% but did not provide strong fibers. The resulting fiber was 11.6% urania.

Example 16

A glass composition comprising 56% silica, 24% soda and 20% urania was melted and formed into fibers which were leached with a 24.4% weight loss. Fairly strong fibers resulted from leaching this composition. The resulting fiber was 25.6% urania.

Example 17

A glass composition comprising 60% silica, 20% soda and 20% urania was fashioned into fibers and leached. The fibers experienced a 21.45% weight loss and were fairly strong. The resulting glass was 23.6% urania.

Example 18

A glass composition comprising 56% silica, 20% soda and 24% urania was melted and formed into fibers which were then leached with 1:1 hydrochloric acid with a resultant 21.9% weight loss. The fibers were fairly strong. The leached fiber has a urania content of 28.3% by weight.

The fibers leached as indicated are very high temperature resistant; all of these fibers remain intact and lose little strength after prolonged treatment at 1800° F. The fibers furthermore remain intact even though subjected to 2300° F. for thirty minutes. Most of these above compositions increased in urania content after leaching since the soda is removed while the other ingredients remain in the fibers. An exception is Example 15 when HCl is used as the leaching acid and an apparent loss of about 4.5% of urania is experienced.

It will be noted that the glass compositions given as illustrations of those that can be leached in accordance with the invention comprise from about 52–77% silica, from about 12–36% soda and from about 4–24% urania. Other compositions from the silica-soda-urania glass system can be used; however, it has been found that compositions having proportions of ingredients outside the range indicated tend to lose urania during the leaching step and for that reason are not preferred. If the leaching process is made less severe by reducing leaching time to less than one hour or strength of acid, other glass compositions from the silica-soda-urania system can be used. The compositions given above are belived to represent the preferred compositions which can be used in leaching processes to provide high concentration urania glass fibers that have good high temperature resistance. It should be pointed out that less vigorous leaching of compositions from the silica-soda-urania system in an effort to reduce the urania loss would require more rigid control of leaching conditions and might, therefore, not be particularly desirable.

Strands of fibers produced with conventional textile forming apparatus from the glass composition of Example 16 were twisted, plied and woven into fabric. The fibers were attenuated from streams of glass from a melt and gathered together in the form of a strand which was wound upon a collet winder. The fibers as they were being formed were treated with a conventional forming size which comprises dextrinized starch, gelatin, vegetable oil, a cationic softener, polyvinyl alcohol, polyoxyethylene sorbitan mono oleate and water. Three percent by weight of the size composition was applied to the fibers based upon the total weight of fibers and treating composition.

Fabrics woven from yarns produced from these strands were leached in 1:1 hydrochloric acid (technical grade HCl in water) at a temperature of 90° C. for one hour. The fabric was then soaked in hot water for one hour and dried.

Before leaching, it has been found preferable to wash the fabric with hot water to remove the starch size. When the size is removed prior to leaching, the leached fabric retains much of the inherent tensile strength of the original fabric and is characterized by a striking gold color after firing the fabric at 1000° F. The leached urania-silica fiber retains a tensile strength as great as 70,000 p.s.i. If the starch size is not first removed, the leached fabric and fiber is very weak and easily pulled apart. The starch or residue remaining on the leached fabric gives the fabric a dull appearance and the gold color is entirely absent.

If the washed fabric is leached and then fired for one hour at 1500° F., the characteristic gold color turns to an olive green color or shades therebetween.

During leaching and firing the fabric shrinks about 20%. This is probably the result of removal of sodium oxide and compaction of the fibers. The fibers produced by leaching Example 16 composition fibers comprise 26% urania and 74% silica, the 20% by weight sodium oxide having been substantially removed by leaching.

The fibers of glass compositions of Example 1 to 18 comprise (after leaching) from about 2% to 30% urania and from about 70% to 98% silica. Increasing amounts of urania apparently improve the properties of the fibers of this invention, but it is preferred to have from 8–30% by weight urania and 70–92% silica to provide high temperature resistance in the fibers and fabric.

These fibers, strands, yarns and fabrics are readily combined with various resins to provide ablative structures designed to withstand application of very high temperatures for at least a short time. Nozzles for jet burners, re-entry shields and many other structures require high temperature resistance, shock resistance and high strength characteristics. Phenolic resin and glass fabric laminates provide such structures. Other thermosetting resins and various inorganic binders can be used in combination with the unique fibers of this invention.

Glass compositions which include thoria instead of urania may be used; however, the urania compositions are preferred. For instance, a glass composition comprising 60% silica, 30% soda and 10% thoria when leached with 1:1 hydrochloric acid provided strong fibers even after leaching, during which a 30.7% weight loss occured. Fibers produced from the thoria composition retained a fair amount of strength and integrity even after seven days at 1800° F. Glasses containing both urania and thoria have been leached to form fairly satisfactory fibers. The loss of thoria and/or urania was in the order of about 2% in the following glass compositions.

A glass composition comprising 56% silica, 24% soda and 10% each of urania and thoria was melted and formed into fibers which were then leached with hydrochloric acid with a 27.3% loss in weight. These fibers were strong after leaching.

Also a glass composition comprising 56% silica, 24% soda, 5% urania and 15% thoria was melted and formed into fibers which were leached with 5:1 sulfuric acid that gave a 25.9% loss in weight. These fibers remained fairly strong even after leaching.

A glass composition comprisnig 56% silica, 24% soda, 15% urania and 5% thoria was melted and formed into fibers with a 30.3% weight loss when leached with hydrochloric acid. The fibers were fairly strong when hydrochloric acid was used as the leaching acid. Five to one sulfuric acid gave a 26.3% weight loss but weaker fibers than those produced with hydrochloric acid.

Glass fibers which have been leached to form high concentration urania or thoria compositions can be further enriched with these ingredients by treating the fibers with a salt of the rare earth which is then reduced to the oxide. The fibers can be used in any installation which requires a fibrous material such as an insulating material that will withstand high temperatures and will retain its fibrous character even for extended periods at high temperature. Furthermore, these high concentration urania or thoria compositions in fibrous form can be utilized as fuel elements and in chemical processing.

The heating of the leached fibers might be referred to as a sintering process since the spaces in the leached structure caused by removal of soda are reduced in volume during heat treating to an extent which results in the reformation of a more typical glass structure having a normal density for the composition.

Potassia or lithia can be utilized as a partial replacement for soda. Since all these materials are to be leached from the resulting fibers, they will have no effect upon the usefulness of the fibers.

Fibers comprising 40% by weight urania can be further enriched by treating them with a solution of uranium chloride or other salt and then with ammonium hydroxide to form a uranium hydrogel. The treated fibers are then fired to form uranium oxide of the gel and to remove the ammonium hydroxide.

Various modifications and variations can be made within the spirit and scope of the appended claims:

I claim:

1. High-temperature resistant glass fibers consisting essentially of, by weight, 70–92% silica and 8–30% urania said fibers ranging from gold to deep olive green in color and said color being formed by heating said fibers to from 1000° F. to about 1500° F.

2. Fabric comprising yarns of glass fibers consisting essentially of 70–92% silica by weight and 8–30% urania by weight, said fabric ranging in color from gold to deep olive green, and said color being formed by heating said fabric to from 1000° F. to about 1500° F.

3. Yarns of glass fibers consisting essentially of from 70–92% silica by weight and 8–30% urania by weight, said yarns ranging in color from gold to deep olive green, and said color being formed by heating said yarns to from 1000° F. to about 1500° F.

4. High-temperature resistant articles comprising glass fibers consisting of from 70–92% silica by weight and from 8–30% urania by weight secured together in an integral structure, said articles ranging in color from gold to deep olive green, and said color being formed by heating said fibers to from 1000° F. to about 1500° F.

5. Method of manufacturing colored, high-temperature resistant glass fibers consisting essentially of silica and urania comprising preparing glass fibers comprising 52–77% silica, 12–36% sodium oxide, and 4–24% urania, washing the surfaces of the glass fibers with hot water to remove protective sizing therefrom, leaching the glass fibers with a mineral acid to remove substantially all of the sodium oxide therefrom without substantial loss of urania, rinsing the leached fibers thoroughly in an aqueous solution to remove the acid therefrom, drying the fibers to form a dry, porous structure, and heating the washed, leached fibers to from 1000° F. to about 1500° F. to form a colored, sintered, urania-silica fibrous glass structure possessing high strength.

6. The method of claim 5 wherein the colored, sintered, urania-silica fibrous glass structure ranges in color from gold to dark olive green.

7. Method of manufacturing colored, high strength, high-temperature resistant fibrous glass fabric comprising producing a fabric of glass fiber yarns comprising from 52% to 77% silica, from 12% to 36% sodium oxide, and from 4% to 24% urania, washing the surfaces of the glass fiber yarns to remove contaminants and present clean reactive surfaces, leaching the washed fabric to remove substantially all sodium oxide without substantial loss of urania, rinsing the leached fabric in an aqueous solution, drying the rinsed leached fabric to form a dry fabric comprising porous yarns, and heating the dry fabric to from 1000° F. to about 1500° F. to form a colored, sintered, urania-silica fibrous glass fabric.

8. The method of claim 7 wherein the colored, sintered, urania-silica fibrous glass fabric ranges in color from gold to dark olive green.

References Cited

UNITED STATES PATENTS

| | | | |
|---|---|---|---|
| 2,461,841 | 2/1949 | Nordberg | 65—31 X |
| 2,491,761 | 12/1949 | Parker et al. | 65—31 |
| 2,928,780 | 3/1960 | Harteck et al. | 106—50 |
| 2,995,803 | 8/1961 | Moore | 65—31 |
| 3,092,531 | 6/1963 | Labino | 65—31 |
| 3,084,054 | 4/1963 | Tiede | 106—52 |
| 3,179,572 | 3/1965 | Perilhou et al. | 176—91 |
| 3,192,026 | 6/1965 | Nordberg et al. | 65—2 |
| 3,252,868 | 5/1966 | Perilhou et al. | 176—91 |

OTHER REFERENCES

Coloured Glasses, Woldemas A. Weyl, originally published in 1951 by the Society of Glass Technology, Sheffield; reprinted by Dawson's of Pall Mall, London, 1959, p. 205.

DONALL, H. SYLVESTER, *Primary Examiner.*

ROBERT L. LINDSAY, *Assistant Examiner.*

U.S. Cl. X.R.

57—140; 65—31, 30, 65; 106—52; 156—24; 161—93